US011753280B2

(12) United States Patent
Sundar S Iyer et al.

(10) Patent No.: US 11,753,280 B2
(45) Date of Patent: Sep. 12, 2023

(54) AXIAL ROTATION DAMPING MECHANISM (71) Applicant: GOODRICH CORPORATION, Charlotte, NC (US)

(72) Inventors: Shyam Sundar S Iyer, Bangalore (IN); Basavaraja Kotyal Mahadevappa, Davanagere (IN); Sanith Kurumpilavu Subramanian, Bangalore (IN); Bejan Maghsoodi, San Dimas, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 568 days.

(21) Appl. No.: 16/937,212

(22) Filed: Jul. 23, 2020

(65) Prior Publication Data
US 2021/0139291 A1    May 13, 2021

(30) Foreign Application Priority Data
Nov. 8, 2019    (IN) .............................. 201941045532

(51) Int. Cl.
B66C 1/34       (2006.01)
B66C 13/04      (2006.01)
F16F 7/06       (2006.01)
H02K 49/04      (2006.01)
F16F 15/129     (2006.01)

(52) U.S. Cl.
CPC ................ B66C 13/04 (2013.01); B66C 1/34 (2013.01); F16F 7/06 (2013.01); F16F 15/1292 (2013.01); H02K 49/043 (2013.01); H02K 49/04 (2013.01)

(58) Field of Classification Search
CPC .... B66C 13/04; B66C 1/34; F16F 7/06; F16F 15/035; F16F 15/1292; F16F 15/1202; H02K 49/043; H02K 49/04

USPC .......................................... 188/267, 78, 136
See application file for complete search history.

(56) References Cited

U.S. PATENT DOCUMENTS

| 2,017,352 | A | 10/1935 | Quick |
| 4,949,812 | A | 8/1990 | Arthur et al. |
| 6,223,868 | B1 | 5/2001 | Wullimann |
| 8,490,751 | B2 | 7/2013 | Allington et al. |
| 8,851,235 | B2 * | 10/2014 | Allington ............... A62B 1/10 188/267 |
| 9,849,982 | B1 * | 12/2017 | Baker Kreiser ......... B25J 9/104 |
| 10,020,720 | B2 * | 7/2018 | Diehl ..................... H02K 49/04 |
| 10,065,507 | B1 * | 9/2018 | Lerner ................... B61H 7/083 |
| 10,265,555 | B2 | 4/2019 | Wu |

(Continued)

FOREIGN PATENT DOCUMENTS

CN    206700524    12/2017

OTHER PUBLICATIONS

European Patent Office, European Search Report dated Aug. 16, 2021 in Application No. 21159671.3.

Primary Examiner — Thomas W Irvin
(74) Attorney, Agent, or Firm — SNELL & WILMER L.L.P.

(57) ABSTRACT

A damping mechanism may comprise a housing, a shaft, a spring arm assembly including a first spring arm, wherein the spring arm assembly is coupled to the shaft and configured to rotate in response to a rotation of the shaft, wherein the first spring arm extends relatively radially outward of the spring arm assembly toward the housing in response to the rotation of the shaft, and wherein the rotation of the shaft is damped in response to extending the first spring arm.

20 Claims, 7 Drawing Sheets (56) References Cited

U.S. PATENT DOCUMENTS

| | | | |
|---|---|---|---|
| 10,333,378 B2* | 6/2019 | Lerner | H02K 49/04 |
| 10,591,002 B2* | 3/2020 | Cultraro | F16F 7/06 |
| 10,594,200 B2* | 3/2020 | Diehl | H02K 49/04 |
| 10,971,988 B2* | 4/2021 | Diehl | B60T 1/005 |
| 11,437,903 B2* | 9/2022 | Diehl | B60T 1/005 |
| 11,512,760 B2* | 11/2022 | Pachys | F16F 15/03 |
| 2017/0244313 A1* | 8/2017 | Diehl | B60T 1/005 |
| 2018/0017113 A1* | 1/2018 | Cultraro | F16F 9/12 |
| 2018/0178045 A1 | 6/2018 | Maarschalk et al. | |
| 2018/0215592 A1 | 8/2018 | Thirunarayana et al. | |
| 2019/0109528 A1* | 4/2019 | Lerner | B61H 7/083 |
| 2022/0196114 A1* | 6/2022 | Pachys | F16F 15/03 |

* cited by examiner

AXIAL ROTATION DAMPING MECHANISM

CROSS REFERENCE TO RELATED APPLICATIONS

This application claims priority to and the benefit of, India Patent Application No. 201941045532 filed on Nov. 8, 2019 and entitled "AXIAL ROTATION DAMPING MECHANISM," which is hereby incorporated by reference in its entirety.

FIELD

The disclosure relates generally to damping mechanism for rotating axles and more particularly to damping axial rotation of lifting hooks.

BACKGROUND

Lifting hooks for cable hoists, winches, cranes and the like often include bearing assemblies tending to enable free rotation of the lifting hook and any suspended load. In this regard, free rotation of the lifting hook tends to inhibit twisting and/or binding of lifting cables and thereby promote safe and efficient operation of the lifting mechanisms. In various hoist applications such as, for example, helicopter rescue devices and/or the like, aerodynamic forces such as may be generated by main rotor downwash in reel in/out operations may tend to cause rotation of the suspended load. In some circumstances, aerodynamic and inertial forces may tend to amplify the rotation rate which may be further amplified and sustained due rotational coupling between the main rotor and the suspended load. In this regard, the undamped free rotation of lifting hooks presents an operational safety hazard during lifting operations.

SUMMARY

In various embodiments, the present disclosure provides a damping mechanism comprising a housing, a shaft, a spring arm assembly including a first spring arm, wherein the spring arm assembly is coupled to the shaft and configured to rotate in response to a rotation of the shaft, wherein the first spring arm extends relatively radially outward of the spring arm assembly toward the housing in response to the rotation of the shaft, and wherein the rotation of the shaft is damped in response to extending the first spring arm.

In various embodiments, the rotation comprises a clockwise rotation and an anti-clockwise rotation, wherein the spring arm assembly comprises a second spring arm, wherein the first spring arm extends in response to the clockwise rotation of the shaft, wherein the second spring arm extends relatively radially outward of the spring arm assembly toward the housing in response to the anti-clockwise rotation of the shaft, and wherein the clockwise rotation is damped in response to extending the first spring arm and the anti-clockwise rotation is damped in response to extending the second spring arm. In various embodiments, a first friction surface is disposed within the housing. In various embodiments, the first spring arm comprises a second friction surface, wherein the second friction surface contacts the first friction surface in response to the rotation of the shaft and generates a friction brake force, wherein the friction brake force is proportional to a rotation rate of the shaft. In various embodiments, a conductive non-magnetic member is disposed within the housing, and a magnetic member is disposed within the housing and configured to rotate relative to the conductive non-magnetic member in response to the rotation of the shaft, wherein an eddy current brake force is generated between the conductive non-magnetic member and the magnetic member in response to the rotation of the shaft, and wherein the rotation of the shaft is damped in response to the eddy current brake force. In various embodiments, the conductive non-magnetic member comprises at least one of an annular ring or a disk. In various embodiments, the first spring arm comprises the magnetic member.

In various embodiments, the present disclosure provides a hook assembly for a hoist system comprising a housing, a bearing disposed within the housing, a hook coupled to the bearing and configured to rotate axially about the bearing; a spring arm assembly including a first spring arm, wherein the spring arm assembly is coupled to the hook and configured to rotate in response to a rotation of the hook, wherein the first spring arm extends relatively radially outward of the spring arm assembly toward the housing in response to the rotation of the hook, and wherein the rotation of the hook is damped in response to extending the first spring arm.

In various embodiments, the rotation comprises a clockwise rotation and an anti-clockwise rotation, wherein the spring arm assembly comprises a second spring arm, wherein the first spring arm extends in response to the clockwise rotation of the hook, wherein the second spring arm extends relatively radially outward of the spring arm assembly toward the housing in response to the anti-clockwise rotation of the hook, and wherein the clockwise rotation is damped in response to extending the first spring arm and the anti-clockwise rotation is damped in response to extending the second spring arm. In various embodiments, a first friction surface is disposed within the housing. In various embodiments, the first spring arm comprises a second friction surface, wherein the second friction surface contacts the first friction surface in response to the rotation of the hook and generates a friction brake force, wherein the friction brake force is proportional to a rotation rate of the hook. In various embodiments, a conductive non-magnetic member is disposed within the housing, and a magnetic member is disposed within the housing and configured to rotate relative to the conductive non-magnetic member in response to the rotation of the hook, wherein an eddy current brake force is generated between the conductive non-magnetic member and the magnetic member in response to the rotation of the hook, and wherein the rotation of the hook is damped in response to the eddy current brake force. In various embodiments, the conductive non-magnetic member comprises at least one of an annular ring or a disk. In various embodiments, the first spring arm comprises the magnetic member.

In various embodiments, the present disclosure provides an aircraft comprising an airframe, a hoist system coupled to the airframe, and a hook assembly coupled to the hoist system comprising a housing, a bearing disposed within the housing, a hook coupled to the bearing and configured to rotate axially about the bearing; a spring arm assembly including a first spring arm, wherein the spring arm assembly is coupled to the hook and configured to rotate in response to a rotation of the hook, wherein the first spring arm extends relatively radially outward of the spring arm assembly toward the housing in response to the rotation of the hook, and wherein the rotation of the hook is damped in response to extending the first spring arm.

In various embodiments, the rotation comprises a clockwise rotation and an anti-clockwise rotation, wherein the spring arm assembly comprises a second spring arm, wherein the first spring arm extends in response to the clockwise rotation of the hook, wherein the second spring arm extends relatively radially outward of the spring arm assembly toward the housing in response to the anti-clockwise rotation of the hook, and wherein the clockwise rotation is damped in response to extending the first spring arm and the anti-clockwise rotation is damped in response to extending the second spring arm. In various embodiments, a first friction surface is disposed within the housing. In various embodiments, the first spring arm comprises a second friction surface, wherein the second friction surface contacts the first friction surface in response to the rotation of the hook and generates a friction brake force, wherein the friction brake force is proportional to a rotation rate of the hook. In various embodiments, a conductive non-magnetic member is disposed within the housing, and a magnetic member is disposed within the housing and configured to rotate relative to the conductive non-magnetic member in response to the rotation of the hook, wherein an eddy current brake force is generated between the conductive non-magnetic member and the magnetic member in response to the rotation of the hook, and wherein the rotation of the hook is damped in response to the eddy current brake force. In various embodiments, the conductive non-magnetic member comprises at least one of an annular ring or a disk.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
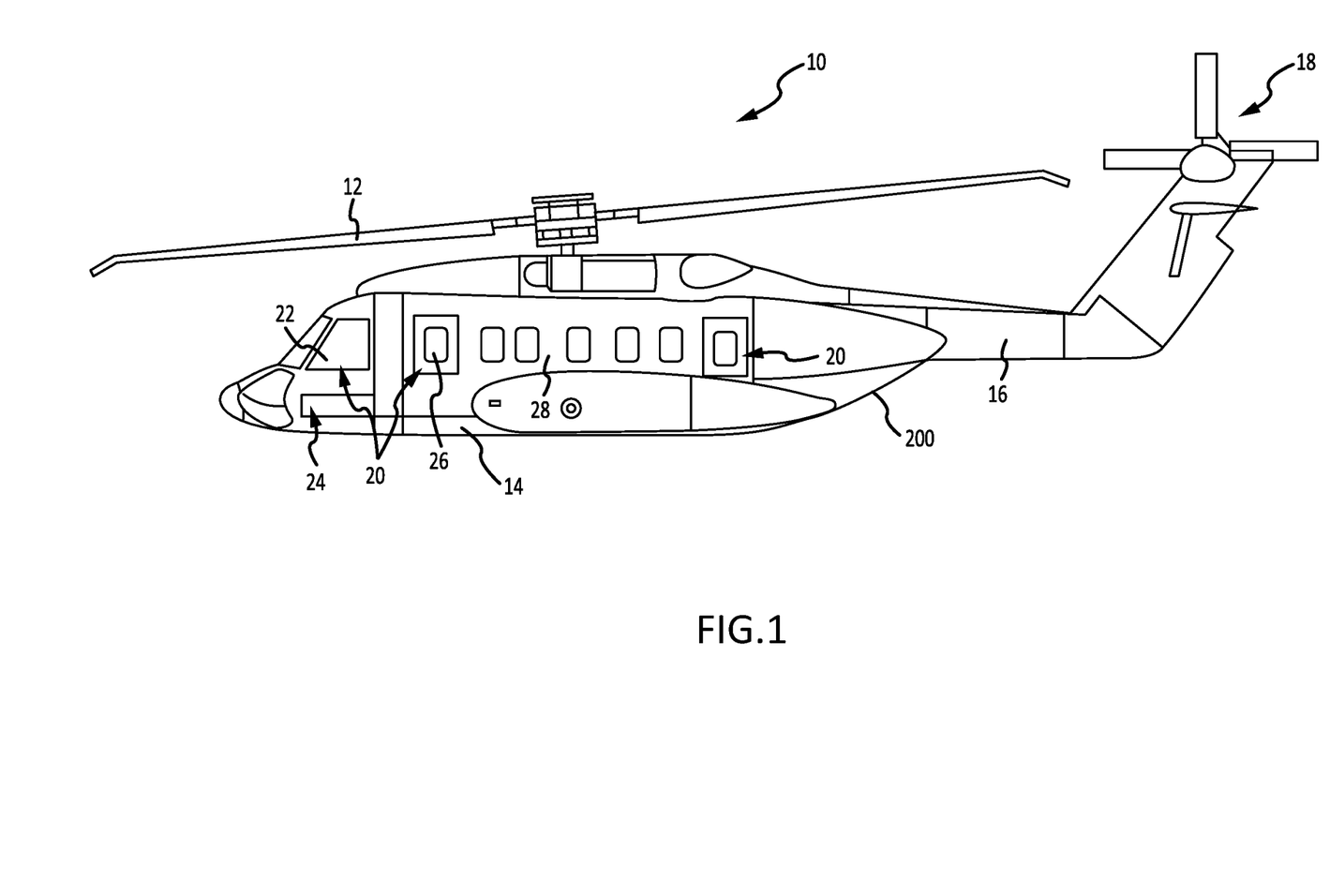
FIG. 1 illustrates an exemplary aircraft including a hoist system, in accordance with various embodiments.

In various embodiments and with reference to FIG. 1, an exemplary aircraft 10 is illustrated. The aircraft 10 may be a vertical takeoff and landing (VOTL) and/or rotary wing aircraft such as, for example, a helicopter. Aircraft 10 includes an airframe 14 having a tail boom 16 coupled to an anti-torque system 18. A main rotor system 12 provides lift to the airframe 14 tending thereby enable the VTOL capability of aircraft 10. Aircraft 10 includes structures 20 which are appropriately sized to facilitate the rapid egress of passengers and/or crewmembers. The structure 20, in one non-limiting embodiment, may be a cockpit window 22 which may partially define an aircraft cockpit 24 and a cabin window 26 which may partially define an aircraft cabin 28. In various embodiments, aircraft 10 includes a hoist system 200 which may be configured to enable loading of passengers and/or cargo into the aircraft cabin 28 while the aircraft 10 is operating in a VTOL or hover mode. Although an aircraft 10 is illustrated in configuration as a helicopter, it will be appreciated by those skilled in the art that many other configurations, machines, and/or structures will also benefit herefrom.

Figure 2:
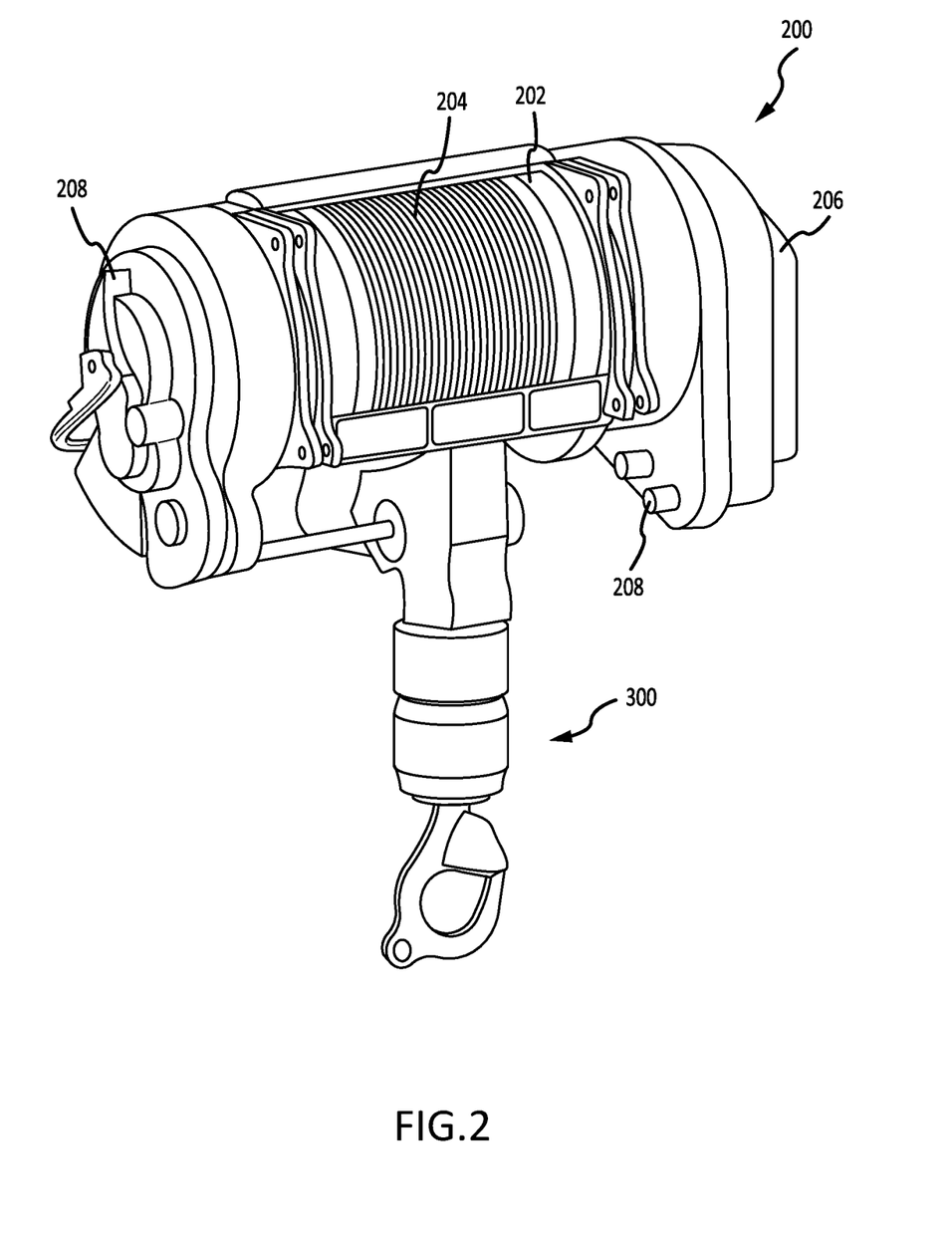
FIG. 2 illustrates an isolated perspective view of a hoist system including a hook assembly, in accordance with various embodiments.

In various embodiments and with additional reference to FIG. 2, an exemplary hoist system 200 is illustrated in isolation from the aircraft 10. Rescue hoist system 200 comprises a reel 202 which retains a spool of cable 204. A drive system 206 is coupled to the reel 202 and enables the cable 204 to controllably spool from the reel 202. Interfaces 208 may operatively couple the rescue hoist system to the aircraft 10 and provide power and control signals to the drive system 206. A hook assembly 300 is coupled to the cable 204.

Figure 3:
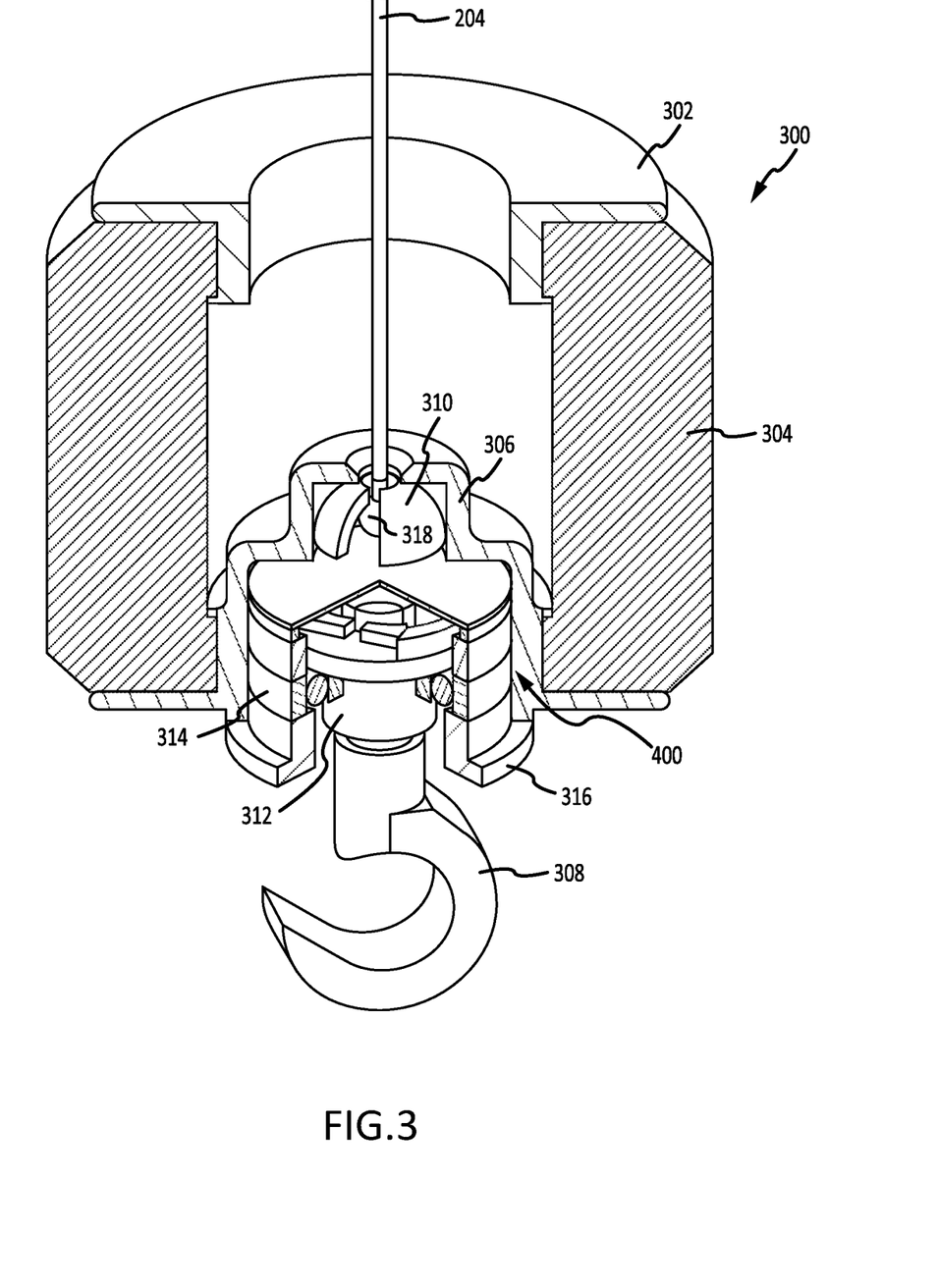
FIG. 3 illustrates a cross sectional view of a hook assembly, in accordance with various embodiments

With additional reference to FIG. 3, a hook assembly 300 of the hoist system 200 is illustrated in perspective cut-away. Cable 204 passes through sticker disk 302 and into the annular body 304 of the hook assembly 300. A housing 306 is coupled to the annular body 304 opposite the sticker disk 302. The cable 204 passes into the housing 306 and is coupled within the housing by a split retainer 310. In various embodiments, the cable 204 may have a relatively spherical ferrule 318 coupled at an end of the cable 204. The split retainer 310 may comprise a hemispherical portion fitted about the cable 204 and configured to interfere with the ferrule 318 in response to tensioning the cable 204. In this regard, tension loads may be transferred from the hook assembly 300 into the cable 204 via the split retainer 310 and the housing 306.

In various embodiments, the hook assembly 300 includes a hook 308. The hook 308 may be coupled to a bearing 314 and thereby configured to rotate thereabout. The bearing 314 is coupled within the housing 306 and retained there within by a bearing retainer 316. In various embodiments, the hook 308 may be coupled to the bearing via a hook nut 312. In this regard, the hook 308 may rotate about its axis (i.e., axially about the bearing 314) thereby tending to minimize twisting of the cable 204. In various embodiments, the hook nut 312 may receive hook load from the hook 308 and transmit the hook load through the bearing 314 and into the housing 306 via the bearing retainer 316. In various embodiments, a spin damper assembly 400 is coupled to the hook 308 and may be retained within the housing 306.

Figure 4A:
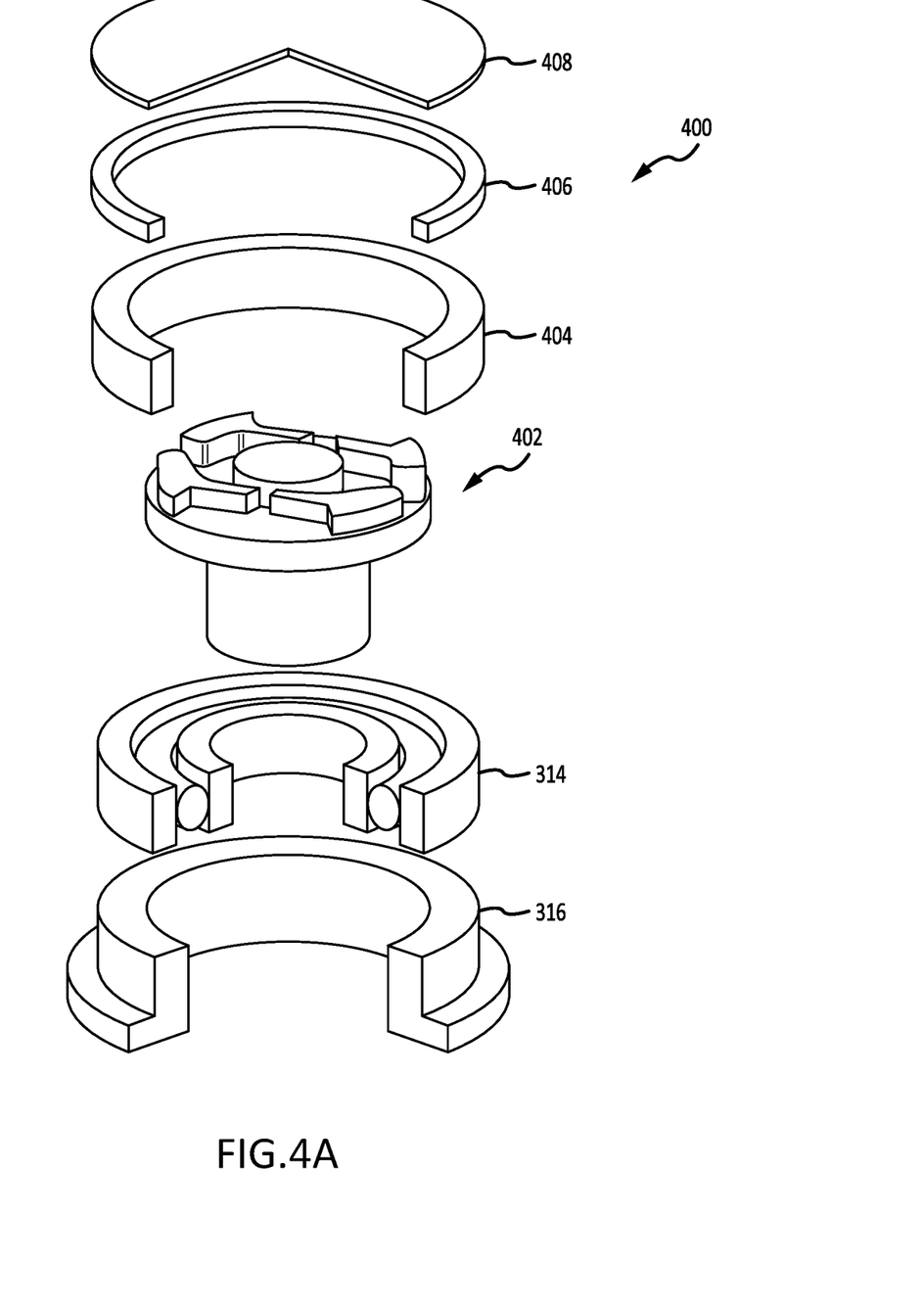
FIG. 4A illustrates a spin damping assembly, in accordance with various embodiments.

In various embodiments and with additional reference to FIG. 4A, an exploded cutaway view of the spin damper assembly 400 is illustrated in relation to the bearing 314 and bearing retainer 316. The spin damper assembly includes a spring arm assembly 402 and a conductive non-magnetic member such as, for example, conductive liner 404 and/or a non-magnetic conductive disk (i.e. conductive disk) 408. In various embodiments the conductive liner 404 comprises an annular ring structure which may be electrically isolated from the conductive disk 408 by an insulator 406.

Figure 4B:
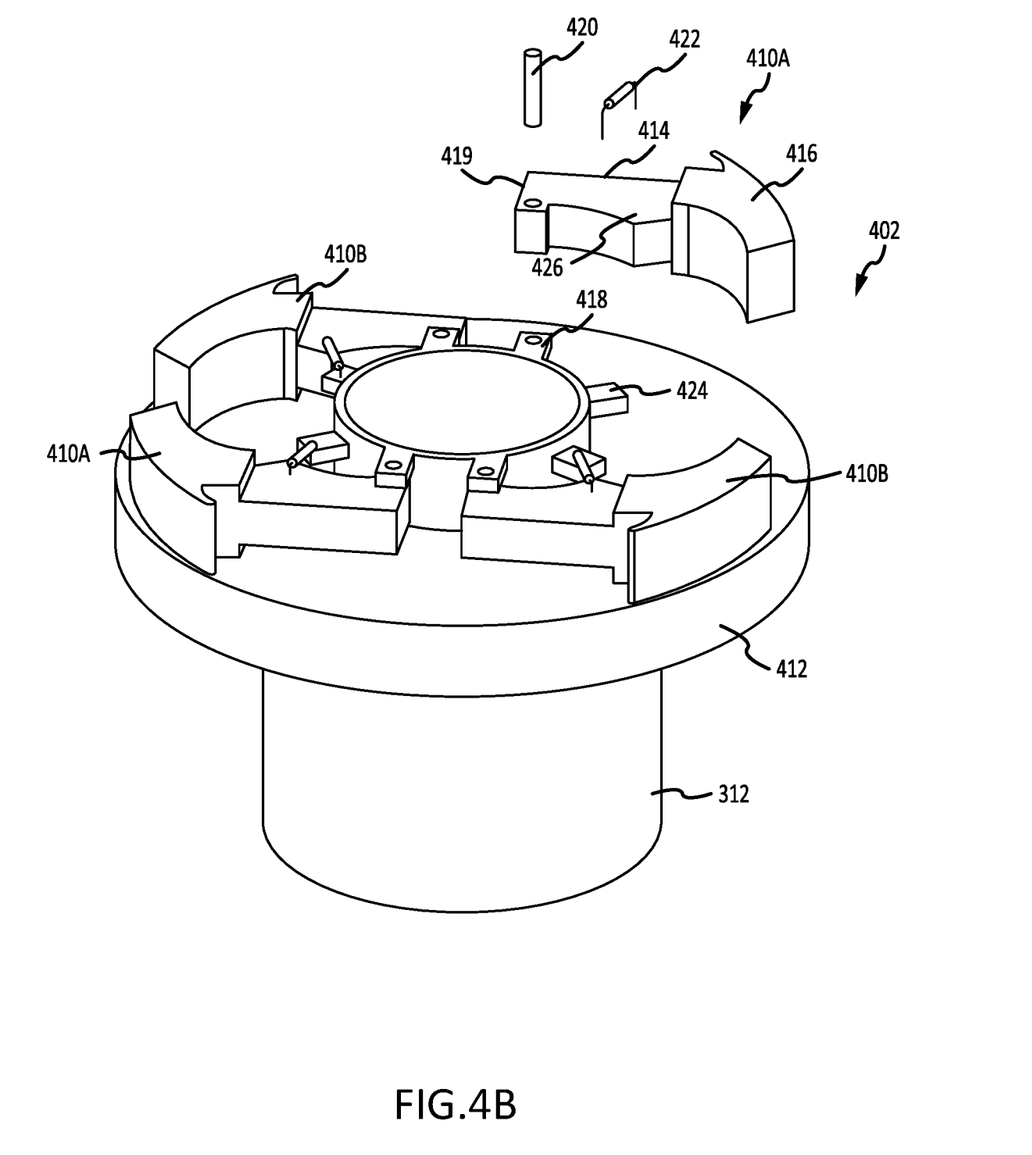
FIG. 4B illustrates a spring arm assembly of a spin damping assembly, in accordance with various embodiments.

In various embodiments and with additional reference to FIG. 4B, an exploded view of the spring arm assembly 402 is illustrated. One or more spring arms 410, e.g., first spring arms 410A and second spring arms 410B are coupled to a carrier disk 412. In various embodiments, carrier disk 412 may be coupled to rotating member such as, for example, a shaft, an axil, a hook, and/or the like and thereby configured to rotate in response to the rotating member. In various embodiments, carrier disk 412 may be coupled to hook nut 312 and thereby configured to rotate in response to a rotation of the hook 308. In various embodiments, each spring arm 410 comprises a lever arm 414 coupled to a head member 416. The lever arm 414 may be flexibly coupled to the carrier disk 412. For example, a distal end 419 of the lever arm 414 (i.e. distal of the head member 416) may be coupled to a pin block 418 of the carrier disk 412 via a pin 420. In this regard, the spring arm 410 may be configured to pivot about the pin block 418. In various embodiments, a spring 422 may be coupled between the spring arm 410 and the carrier disk 412. In various embodiments, the spring 422 may be coupled to a spring block 424 of the carrier disk 412 and spring coupling 426.

Springs 422 may be pre-loaded and, in this regard, a spring force may be generated by spring 422 tending thereby to retain the spring arm 410 relatively within the circumference of the carrier disk 412. In various embodiments, the mass of the spring arm 410 may be relatively unevenly distributed. For example, head member 416 may comprise between 60% to 90% of the mass of the spring arm 410 relative to the lever arm 414. In various embodiments and with additional reference to FIG. 5, a cross-sectional view of the spin damper assembly 400 is illustrated in a plane parallel to the carrier disk 412. In response to rotation of the rotating member, the carrier disk 412 may rotate in a clockwise direction as shown by arrow 502 or an anti-clockwise direction as shown by arrow 504. The rotation tends to generate a centrifugal force at the spring arm 410 which may be balanced by the spring force. As the rate of rotation increases, the centrifugal force at the spring arm 410 tends to exceed the spring force driving the spring arms 410 relatively radially outward (as indicated by arrows) of the spring arm assembly 402 toward the housing 306. In various embodiments, the spring arms 410 are arranged such that first spring arms 410A extend in response to the clockwise rotation and the second spring arms 410B extend in response to the anti-clockwise rotation. In this regard, the rotation of the rotating member may tend to be damped by extending a spring arm 410. In various embodiments, the spring force, spring position, and mass distribution of the spring arm 410 may be configured to selectable deploy the spring arms 410 at a desired rotation rate of the rotating member. In this regard, the spin damper assembly may tend to apply a braking force or damp the rotation of the rotating member in response the rotating member exceeding a rotation rate threshold.

Figure 5:
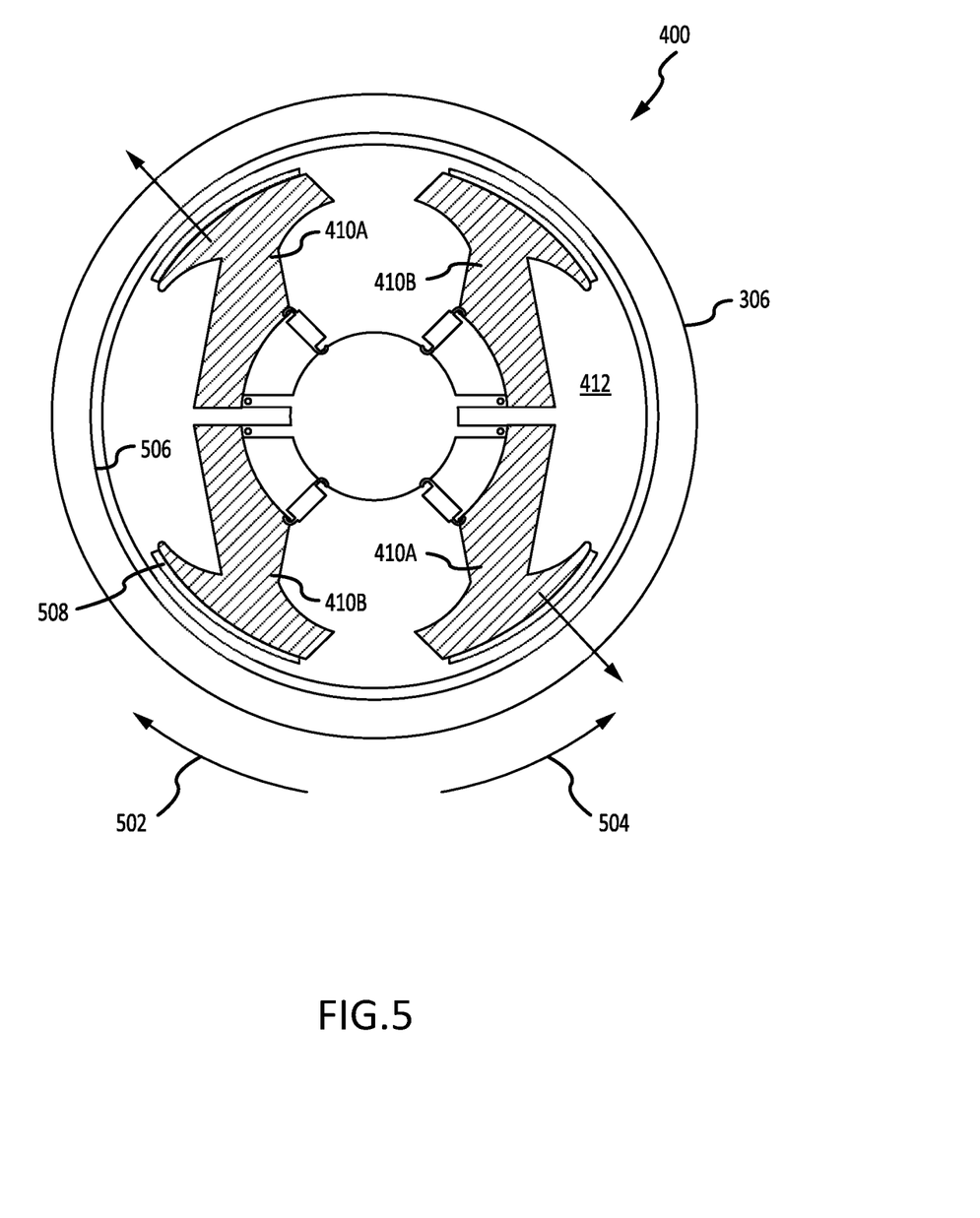
FIG. 5 illustrates a cross sectional view of a spin damping assembly, in accordance with various embodiments.

In various embodiments, the housing may include a first friction surface 506 disposed therein. The first friction surface 506 may lie relatively radially outward of the spring arms 410 and the carrier disk 412. The head member 416 of the spring arm 410 may include a second friction surface 508. In various embodiments, the second friction surface is configured to contact the first friction surface in response to the rotation of the rotating member. In response to the contact between the fiction surfaces (506, 508) a friction brake force is generated proportional to the rotation rate of the rotating member. In this regard, an increase in rotation rate tends to increase the friction force by increasing the centrifugal force at the spring arm 410. In various embodiments, a friction surface such as the first friction surface 506 and/or the second friction surface 508 may comprise a disrupted surface, a brake material, and/or the like having a relatively greater dynamic coefficient of friction than the proximate surface material of the housing. In various embodiments, a friction surface may comprise a non-magnetic non-conductive material.

In various embodiments, the first friction surface 506 lies relatively radially inward of the conductive liner 404. The spring arms 410 may comprise a magnetic material, may include an array of permanent magnetic inserts, or may otherwise generate magnetic flux. In various embodiments, the magnetic flux may be concentrated as sectorial pads at a radial contact face of the spring arm 410. In this regard, deployment of the spring arm in response to the rotation of the rotating member closes a radial air gap between the spring arm 410 and the conductive liner 404. The spring arm 410 (i.e., a magnetic member) rotates relative to the conductive liner 404 (i.e., a conductive non-magnetic member). In response, an eddy current brake force is generated between conductive liner 404 and the spring arm 410 (i.e., a radial eddy current brake force) by generating eddy currents having an opposing magnetic field consistent with Lenz's law. As the rotation rate of the rotating member increases, the radial air gap may further decrease and thereby increase the eddy current brake force thus further damping the rotation of the rotating member.

In various embodiments and with brief additional reference to FIG. 3, the conductive disk 408 may be placed in plane parallel to the carrier disk 412 and axially proximate the spring arms 410. An axial air gap may extend between the conductive disk 408 and the axial face of the spring arms 410. The conductive disk 408 is electrically isolated from the conductive liner 404 by an insulator 406 and, in this regard, a second eddy current brake force may be generated. The spinning magnetic members in proximity to the conductive disk 408 are in relative rotational motion and thereby generate an axial eddy current braking force. As the rotation rate increases the eddy current break force tends to increase as a function of the increase in magnetic field intensity of the opposing field thereby further damping the rotation of the rotating member. In this regard, each of the eddy current brake forces may have a complimentary effect to improve the braking and in two independent directions (radial and axial). The radial eddy current braking force equation being generally driven by an increase with respect to radial gap between the spring arm 410 and the conductive liner 404 with the axial eddy current braking force equation being generally driven by an increase in rotation rate of the rotating member. Thus, the rate of rotation of the rotating member may be the driving factor for the eddy current brake force and the system may exhibit a self-regulating and/or feedback damping effect on the rotation rate. At low rotational rate the axial magnetic damping (i.e., eddy current brake force) generated by the interactions with the conductive disk 408 tends to be pre-dominant. At high rotational rate where the centrifugal forces increase the radial eddy current braking forces generated by the spring arm 410 interaction with the conductive liner 404 add on to improve the damping effect. In various embodiments, the damping effect may be further combined with the friction damping as described above. In this regard, the system may exhibit desirable braking characteristics across a wide range of rotational rates.

Figure 6:
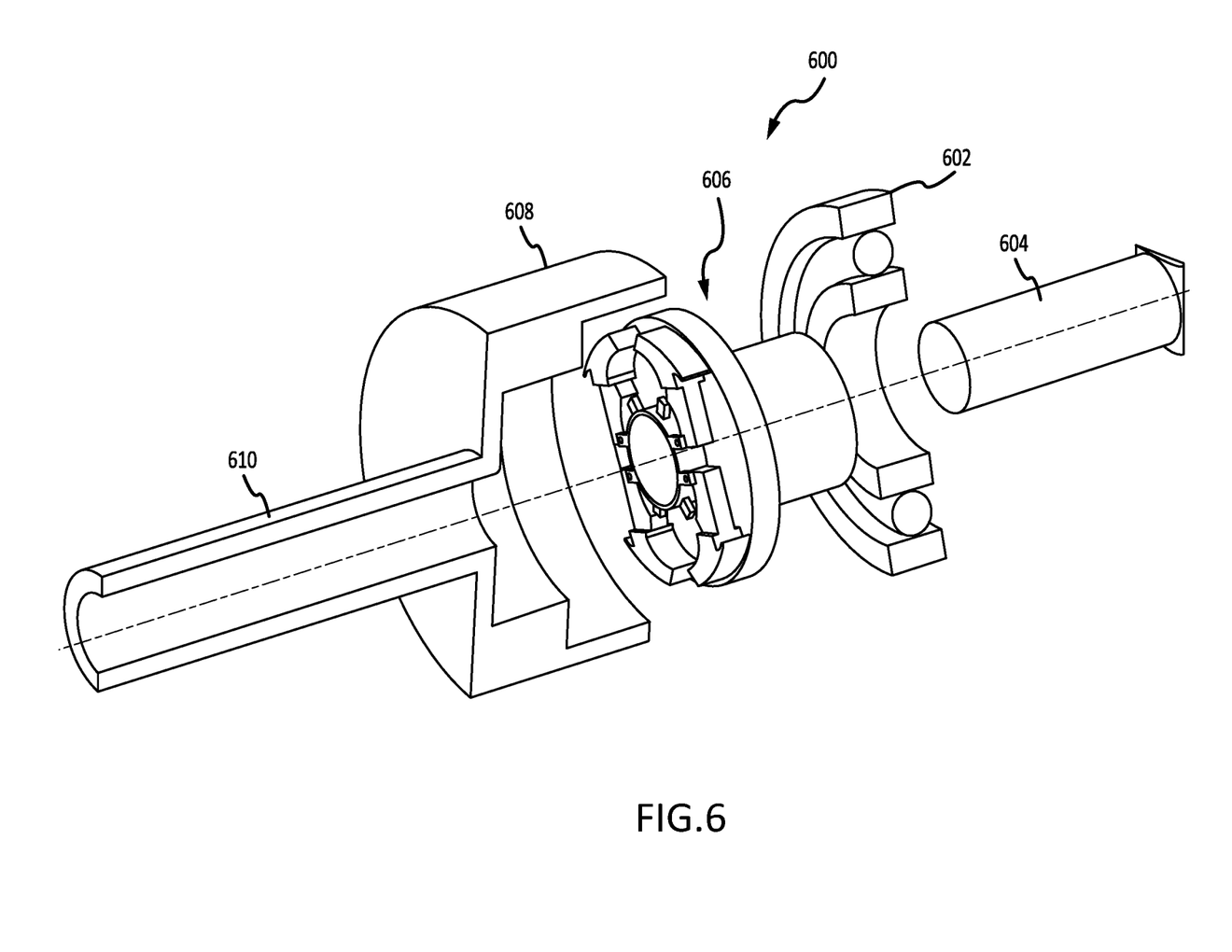
FIG. 6 illustrates a damping mechanism, in accordance with various embodiments.

In various embodiments and with additional reference to FIG. 6, a spin damping mechanism 600 is illustrated. Spin damping mechanism 600 comprises various features, materials, geometries, construction, manufacturing techniques, and/or internal components similar to spin damper assembly 400. Spin damping mechanism 600 comprises a bearing assembly 602, a rotating member 604, a spring arm assembly 606, and a housing 608. The rotating member 604 is coupled to the spring arm assembly 606 and, in this regard, the spring arm assembly may be configured to rotate in response to a rotation of the rotating member. The bearing assembly 602 and the spring arm assembly 606 may be disposed within the housing 608. In response to the rotation of the rotating member 604, a spring arm of the spring arm assembly may extend relatively radially outward of the spring arm assembly 606 toward the housing 608 and thereby damp the rotation of the rotating member as described above. In various embodiments, the housing 608 may include an axle or shaft sleeve structure 610 which may accept the rotating member 604.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A rotational damping mechanism, comprising:
   a housing;
   a rotating member;
   a spring arm assembly including a first spring arm,
   wherein the spring arm assembly is coupled to the rotating member and configured to rotate in response to a rotation of the rotating member,
   wherein the first spring arm extends radially outward of the spring arm assembly toward the housing in response to the rotation of the rotating member, and
   wherein the rotation of the rotating member is damped in response to extending the first spring arm due to a friction brake force caused by extending the first spring arm and an eddy current brake force caused by extending the first spring arm.

2. The damping mechanism of claim 1, wherein the rotation comprises a clockwise rotation and an anti-clockwise rotation,
   wherein the spring arm assembly comprises a second spring arm, wherein the first spring arm extends in response to the clockwise rotation of the rotating member,
   wherein the second spring arm extends radially outward of the spring arm assembly toward the housing in response to the anti-clockwise rotation of the rotating member, and
   wherein the clockwise rotation is damped in response to extending the first spring arm and the anti-clockwise rotation is damped in response to extending the second spring arm.

3. The damping mechanism of claim 1, further comprising a first friction surface disposed within the housing.

4. The damping mechanism of claim 3, wherein the first spring arm comprises a second friction surface, wherein the second friction surface contacts the first friction surface in response to the rotation of the rotating member and generates the friction brake force, wherein the friction brake force is proportional to a rotation rate of the rotating member.

5. The damping mechanism of claim 1, further comprising:
   a conductive non-magnetic member disposed within the housing, and a magnetic member disposed within at least the first spring arm and configured to rotate relative to the conductive non-magnetic member in response to the rotation of the rotating member, wherein the eddy current brake force is generated between the conductive non-magnetic member and the magnetic member in response to the rotation of the rotating member, and wherein the rotation of the rotating member is damped in response to the eddy current brake force.

6. The damping mechanism of claim 5, wherein the conductive non-magnetic member comprises at least one of an annular ring or a disk.

7. The damping mechanism of claim 5, wherein the first spring arm comprises the magnetic member.

8. A hook assembly for a hoist system, comprising:
a housing;
a bearing disposed within the housing;
a hook coupled to the bearing and configured to rotate axially about the bearing;
a spring arm assembly including a first spring arm,
wherein the spring arm assembly is coupled to the hook and configured to rotate in response to a rotation of the hook,
wherein the first spring arm extends radially outward of the spring arm assembly toward the housing in response to the rotation of the hook, and
wherein the rotation of the hook is damped in response to extending the first spring arm.

9. The hook assembly of claim 8, wherein the rotation comprises a clockwise rotation and an anti-clockwise rotation,
wherein the spring arm assembly comprises a second spring arm, wherein the first spring arm extends in response to the clockwise rotation of the hook,
wherein the second spring arm extends radially outward of the spring arm assembly toward the housing in response to the anti-clockwise rotation of the hook, and
wherein the clockwise rotation is damped in response to extending the first spring arm and the anti-clockwise rotation is damped in response to extending the second spring arm.

10. The hook assembly of claim 8, further comprising a first friction surface disposed within the housing.

11. The hook assembly of claim 10, wherein the first spring arm comprises a second friction surface, wherein the second friction surface contacts the first friction surface in response to the rotation of the hook and generates a friction brake force, wherein the friction brake force is proportional to a rotation rate of the hook.

12. The hook assembly of claim 8, further comprising:
a conductive non-magnetic member disposed within the housing, and
a magnetic member disposed within the housing and configured to rotate relative to the conductive non-magnetic member in response to the rotation of the hook,
wherein an eddy current brake force is generated between the conductive non-magnetic member and the magnetic member in response to the rotation of the hook, and wherein the rotation of the hook is damped in response to the eddy current brake force.

13. The hook assembly of claim 12, wherein the conductive non-magnetic member comprises at least one of an annular ring or a disk.

14. The hook assembly of claim 12, wherein the first spring arm comprises the magnetic member.

15. A aircraft comprising:
an airframe;
a hoist system coupled to the airframe; and
a hook assembly coupled to the hoist system comprising:
a housing;
a bearing disposed within the housing;
a hook coupled to the bearing and configured to rotate axially about the bearing;
a spring arm assembly including a first spring arm,
wherein the spring arm assembly is coupled to the hook and configured to rotate in response to a rotation of the hook,
wherein the first spring arm extends radially outward of the spring arm assembly toward the housing in response to the rotation of the hook, and
wherein the rotation of the hook is damped in response to extending the first spring arm.

16. The aircraft of claim 15, wherein the rotation comprises a clockwise rotation and an anti-clockwise rotation,
wherein the spring arm assembly comprises a second spring arm, wherein the first spring arm extends in response to the clockwise rotation of the hook,
wherein the second spring arm extends radially outward of the spring arm assembly toward the housing in response to the anti-clockwise rotation of the hook,
wherein the clockwise rotation is damped in response to extending the first spring arm and the anti-clockwise rotation is damped in response to extending the second spring arm.

17. The aircraft of claim 15, further comprising a first friction surface disposed within the housing.

18. The aircraft of claim 17, wherein the first spring arm comprises a second friction surface, wherein the second friction surface contacts the first friction surface in response to the rotation of the hook and generates a friction brake force, wherein the friction brake force is proportional to a rotation rate of the hook.

19. The aircraft of claim 15, further comprising:
a conductive non-magnetic member disposed within the housing, and
a magnetic member disposed within the housing and configured to rotate relative to the conductive non-magnetic member in response to the rotation of the hook,
wherein an eddy current brake force is generated between the conductive non-magnetic member and the magnetic member in response to the rotation of the hook, and wherein the rotation of the hook is damped in response to the eddy current brake force.

20. The aircraft of claim 19, wherein the conductive non-magnetic member comprises at least one of an annular ring or a disk.

* * * * *